3,069,724
EXTRUSION DIE WITH MANDREL
Hans-Otto Schiedrum, Frankfurt am Main, Germany, assignor to Farbwerke Hoechst Aktiengesellschaft vormals Meister Lucius & Brüning, Frankfurt am Main, Germany, a corporation of Germany
Filed Feb. 15, 1960, Ser. No. 8,855
Claims priority, application Germany Feb. 18, 1959
5 Claims. (Cl. 18—14)

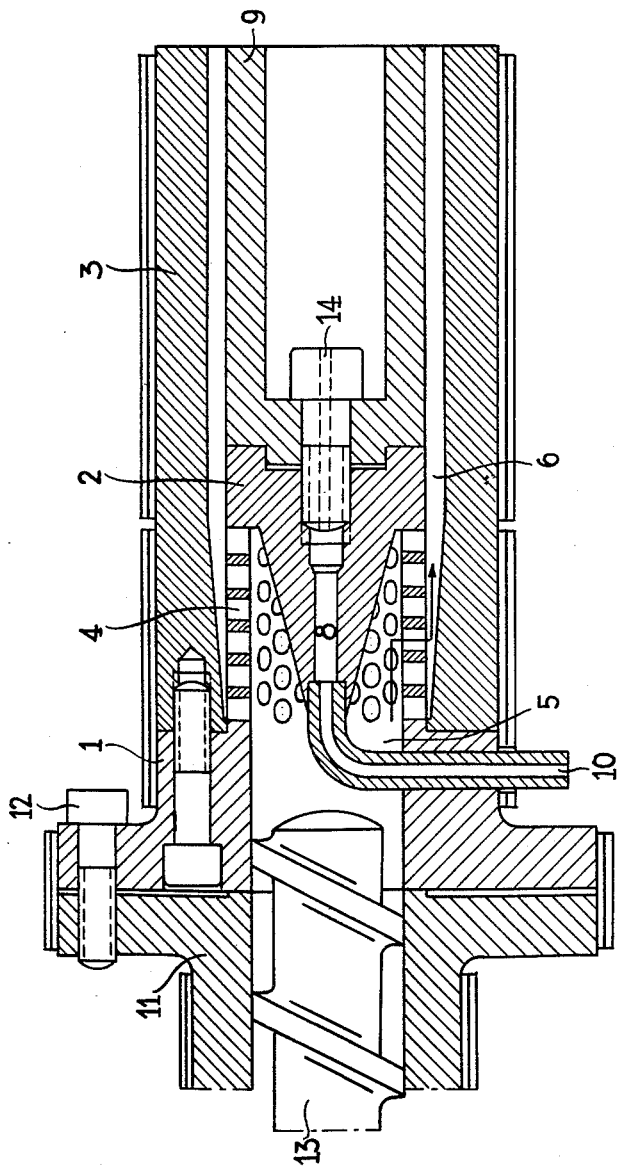

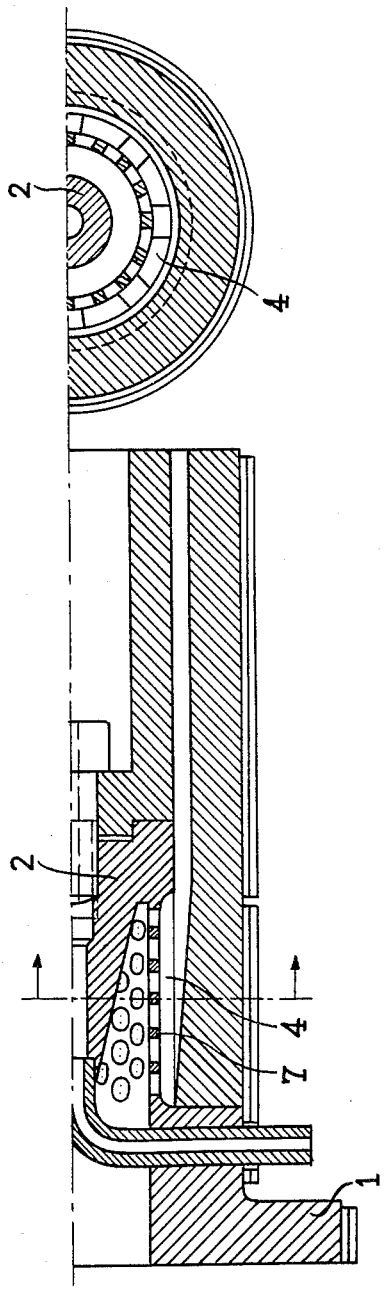
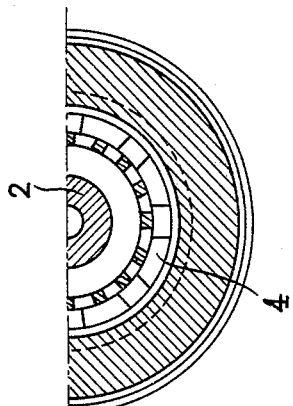

The present invention relates to an extrusion die provided with a mandrel for extruders used for working up plastic materials, particularly thermoplastic materials, into hollow profiles.

It is known to support the mandrel necessary for shaping the hollow profiles by webs. The webs are disposed in the passage for the material; they are radially arranged and generally have stream-line cross-sections. Each of the webs subdivides the plastic material traveling through the extruder and leaves traces which appear in the finished profiles as marks or cracks or lead to an irregular wall thickness.

It is also known to mount the mandrel on a breaker plate and fix the latter to the orifice or the screw casing or between the screw casing and the orifice. The apertures of the breaker plate are arranged in parallel with the axis of the orifice or screw. Such breaker plates also produce marks because the subdivided plastic material welds together only unsatisfactorily after the breaker plate. Attempts have been made to remove the aforesaid disadvantages by arranging baffle spaces after the webs or breaker plates. These spaces are intended to disturb the flow of material and to remove any traces left by the rewelding of the material. For the same purpose, conical orifices and mandrels tapering in the direction of the orifice have also been used. These measures require not only complicated apparatus but are also of little effect. They fail to produce the desired effect especially in the case of thick-walled tubes which have to meet high requirements as regards the uniformity of the wall thickness.

The present invention provides an extrusion die which enables the aforesaid disadvantages to be overcome and permits the manufacture of tubes or other hollow profiles that meet high demands as regards the uniformity of wall thickness and tolerance of inside and over-all dimensions. According to the invention, the mandrel carrier 1 is a long hollow body which is closed at one end by a bottom 2. The casing of the hollow body is provided with a plurality of apertures 4 which are arranged vertically to the wall of the orifice 3 or are inclined towards said wall. The apertures 4 connect the interior space 5 of the mandrel carrier with the hollow space 6 formed by the orifice and the mandrel in a manner such that the plastic material is passed into the hollow space 6 in a twice deflected manner. In this manner, tubes which are substantially free from marks and are true to size can be obtained without great expenditure of apparatus. This is surprising since in the known apparatus the mandrel is supported by webs or other holding devices which are disposed in the passage for the plastic material in such a manner that the direction of flow of the plastic material is little influenced by these devices and since in many cases the webs have, for example, drop-shaped or stream-line cross-sections.

By varying the shape of the cross-section and its dimensions, the extrusion die according to the invention can easily be adjusted to the profile to be produced. For the manufacture of tubes, for example, the mandrel carrier is advantageously constructed as an axially symmetrical hollow body the casing of which is provided with apertures which are radial or inclined with respect to the wall of the orifice 3. For making thick-walled tubes, rather long hollow bodies may be used as mandrel carriers, while for thin-walled tubes shorter hollow bodies may be used. In this manner, the sum of the aperture cross-sections can be adjusted to the plastic material used in a given case and the loss of pressure can be influenced.

The apertures may be of desired shape and dimensions. However, the sum of the aperture cross-sections should advantageously be small, that is to say—if the thermal stability of the plastic material and the pressure which is built up in the extruder permit a certain scope for the sum of the aperture cross-sections—this sum should be advantageously nearer the lower than the upper limit for the sum of aperture cross-sections. The same applies to the individual apertures: it is more advantageous to use a plurality of relatively small apertures than only a few relatively large apertures. The lower limit for the size of the individual aperture is given by the rheological properties of the plastic material, its thermal stability and the permissible loss of pressure. The cross-sections may be of desired shape. It is, however, advantageous, for reasons of manufacture, to use round or slit-shaped cross-sections.

By changing the mandrel carrier, the optimum ratio of aperture can be determined for every dimension of the finished hollow bodies and for every plastic material. To reduce the number of extrusion dies and/or mandrel carriers to be kept in stock, an exchangeable jacket consisting of a perforated sheet or a sieve is advantageously disposed before the apertures of the casing of the mandrel carrier. In this manner one mandrel carrier may be used for all hollow bodies of the same internal cross-section. According to this conception of the invention, the casing of the mandrel carrier is provided only with a few, relatively large apertures which can be adjusted to the desired wall-thickness or the plastic material to be used by simple insertion of the corresponding perforated sheet or sieve serving as jacket 7. If tubes of different wall thickness are to be produced while using the same composition or quality of plastic material, for example the same type of plastic, the mandrel carrier may be designed for the greatest wall thickness and the apertures are adjusted in a given case by covering them partially with a full jacket sheet instead of with a perforated sheet or a sieve.

The extrusion die of the invention has the further advantage that supporting or blowing air or, if desired, energy or an energy carrier can be introduced through the bottom of the mandrel carrier, without breaking through the plastic material after the mandrel carrier, by providing the bottom 2 of the mandrel carrier with an opening or bore hole 8 through which the interior space of the manrel 9 can be connected with a pipe 10 leading through the casing of the mandrel carrier.

An example of an apparatus constructed in accordance with the invention is shown in the accompanying drawings:

Referring to the drawings, FIG. 1 and 2 are side elevations of the extrusion die. FIG. 3 is a cross-sectional view of the orifice and the mandrel carrier of the extrusion die.

According to FIG. 1, the extrusion die is secured to the extruder housing 11 by screws 12 and centered with that housing. The extrusion die comprises a mandrel carrier 1 which has the form of a long hollow body which is closed at one end by a bottom 2. The casing of the mandrel carrier is provided with a plurality of apertures 4, i.e. bore holes. The latter are directed radially to the wall of the orifice 3 which is mounted on, and centered with, the mandrel carrier. The apertures may also be tangentially inclined towards the wall of the mouth piece 3. They connect the interior space 5 of the mandrel carrier with the hollow space 6 formed by the orifice 3 and the mandrel 9.

The plastic material which is conveyed by the screw 13 is pressed from the interior space 5 of the mandrel carrier, as indicated by the arrow, in a twice deflected manner through the apertures 4 into the hollow space 6 and made into a hollow profile in the space between the orifice 3 and the mandrel 9. In the production of thin-walled profiles, the extruded profile may be supported by introducing air via pipe 10 through the bore hole 8 of bottom 2 and the hollow screw 14 into the interior of the profile. FIGS. 2 and 3 show a modification of the extrusion die of the invention in which the casing of the mandrel carrier is provided with relatively large apertures 4 and an exchangeable jacket 7 consisting of a perforated sheet is disposed before the apertures in order to adjust the latter to the particular requirements in a given case.

I claim:

1. An extrusion die for extruding a plastic material in the form of a hollow body which comprises a die head forming the tubular wall of an extruding chamber having a discharge end, said wall having multiple apertures at the discharge end of the chamber; said die head having fixed thereto an elongated and hollow member surrounding, spaced from and extending beyond the discharge end of the chamber; a mandrel surrounded by and substantially coextensive with said hollow member, said mandrel being fixed to the die head, closing the discharge end of the chamber, having a tapered portion extending into the discharge end of the chamber and forming a tubular orifice with the hollow member; and a stock screw rotatable in the die head for forcing plastic material into the extruding chamber, through the apertures in the wall in the discharge end thereof and into the orifice between the mandrel and the hollow member.

2. An extrusion die as defined in claim 1 wherein the chamber, the hollow member, and the mandrel are cylindrical and have a common axis.

3. The extrusion die of claim 1 wherein the apertures are inclined towards the wall of the orifice.

4. The extrusion die of claim 1 wherein the apertures have round cross-sections.

5. The extrusion die of claim 1 wherein the apertures have slit-shaped cross-sections.

References Cited in the file of this patent

UNITED STATES PATENTS

| | | |
|---|---|---|
| 2,433,937 | Tornberg | Jan. 6, 1948 |
| 2,750,626 | Henning | June 19, 1956 |
| 2,908,938 | Taylor | Oct. 20, 1959 |